United States Patent

Nishikawa et al.

[11] Patent Number: 5,262,246
[45] Date of Patent: Nov. 16, 1993

[54] MATERIAL FOR USE IN SPACECRAFT PARTS

[75] Inventors: Takao Nishikawa; Katsumi Sonoda; Yoshiko Aiba; Hiroshi Adachi, all of Amagasaki, Japan

[73] Assignee: Mitsubishi Denki Kabushiki Kaisha, Tokyo, Japan

[21] Appl. No.: 633,236

[22] Filed: Dec. 21, 1990

[30] Foreign Application Priority Data

Dec. 26, 1989 [JP] Japan ................... 1-337931

[51] Int. Cl.$^5$ ............... B32B 27/30; C08F 30/10; C08F 112/08
[52] U.S. Cl. .................. 428/500; 106/287.19; 428/220; 428/521; 428/908.8; 526/240; 526/346
[58] Field of Search ............ 428/375, 379, 387, 389, 428/391, 446, 447, 450, 500, 521, 908.8; 106/287.1, 287.19; 244/158 A, 126; 528/17, 18, 33; 526/240, 279, 309, 346

[56] References Cited

U.S. PATENT DOCUMENTS

| | | | |
|---|---|---|---|
| 3,294,717 | 12/1966 | Krantz | 528/18 X |
| 4,292,419 | 9/1981 | Kamada et al. | 526/192 |
| 4,397,994 | 8/1983 | Takeuchi et al. | 525/332.3 |
| 4,746,693 | 5/1988 | Meder | 524/306 |
| 4,980,206 | 12/1990 | Torre et al. | 427/385.5 |
| 5,021,585 | 6/1991 | Dougherty et al. | 548/406 |
| 5,039,771 | 8/1991 | Morimoto et al. | 528/14 |
| 5,073,607 | 12/1991 | Katz | 525/431 |

FOREIGN PATENT DOCUMENTS 0241158  3/1987  European Pat. Off. .
0417778A1  9/1990  European Pat. Off. .

OTHER PUBLICATIONS

Visentine et al, "STS Atomic Oxygen Effects Experiment", AIAA 23rd Aerospace Sciences Meeting, paper 85-0415 (1985).
Leger et al, "A Consideration of Atomic Oxygen Interactions . . . ", J. Spacecraft and Rockets, vol. 23, No. 5 (1986), pp. 505-511.
Chemical Abstracts, vol. 104, No. 16, De Rody, A. "The degradation of metal surfaces by atomic oxygen", p. 271, (1986).

Primary Examiner—George F. Lesmes
Assistant Examiner—Christopher Brown
Attorney, Agent, or Firm—Wolf, Greenfield & Sacks

[57] ABSTRACT

A material for spacecrafts pertaining to this invention is made of a compound containing the group IV b elements, as a material of which proof for oxygen atom is absolutely necessary. The application of this material, in the form of a shield part (a resin layer) for covering at least a portion of material used in a structural part of the spacecraft enables a long use (from several months to several decades or more) in the oxygen atom environment in the space, which was impossible in the part.

9 Claims, 5 Drawing Sheets

MATERIAL FOR USE IN SPACECRAFT PARTS

BACKGROUND OF THE INVENTION

1. Field of the Invention

This invention relates to material for use in spacecraft parts which averts degradation of the surfaces caused by oxygen interaction.

2. Description of the Prior Art

The successful flight of the Space Shuttle in the low earth orbit (altitude of about 100~1000 km) has clearly contributed to today's thriving spacecraft technologies including the construction of space stations, in the low earth orbit. Such technological development is nevertheless faced with difficult problems: as discussed in *J. Spacecraft and Rockets*, Vol. 23 (1986), pp. 501 to 511, a major component of the atmosphere in this altitude (low earth orbit) is the oxygen atom. These oxygen atoms, impacting on the atmospherically exposed surfaces of the spacecraft navigating in the orbit, cause a severe degradation of material used in the surfaces of the spacecraft parts.

More specifically, 23rd Aero. Sci. Meet., paper No. 85-0415 (1985) discloses the result of a flight test conducted to explore degradation, caused by the oxygen interaction, of material used in spacecraft parts and confirmed a degradation, i.e., a loss of the surface layer, of such material as FRP (fiber reinforced plastic), including CFRP and the like which were traditionally used in the spacecraft parts. Therefore, use of such materials for the spacecraft parts for a prolonged use (from several months to several decades), including space stations being developed presently or scheduled to develop in future, is unfeasible.

The above study also argues that, during several tens of hours of test flights, such commercial trade marks as Kapton and Miller, traditionally used in solar battery panels, sustained losses of as much as approximately 10 $\mu m$ of the surface layer. Again, this is indicative of problematic use of traditional materials in the solar battery panels to be loaded in the spacecraft designed for a prolonged use in the orbit.

Further, it is also concluded in the above study that, as a result of those test flights, such metallic materials as silver and osmium sustain a severe degradation of the surface layer, including loss of the surface layer. These materials, currently used in exposed wire placed on the interconnecting part of a solar battery mounted on a spacecraft, would be unlikely to be used in the exposed construction parts of the spacecraft designed for the prolonged use in the orbit.

SUMMARY OF THE INVENTION

An object of the present invention is to solve the problems mentioned above by providing material having resistance to atomic oxygen for use in spacecraft parts such as wires and panels having resistance to atomic oxygen, which averts degradation of the surfaces of the spacecraft parts even if it is exposed to the oxygen atom in space for a long time (for several decades).

In order to attain the object, the material pertaining to this invention is made of a compound that contains the group IV b elements, and a shield layer (resin layer) which covers at least a portion of the above mentioned) material is applied, as a structuring material of the spacecraft of which resistance of atomic oxygen was absolutely necessary. Thus, a structure which will tolerate the exposure to the oxygen atom in space for a long time (from several months to several decades) will be obtained.

That is the materials for the spacecraft pertaining to the present invention avert degradation of the surfaces of the spacecraft by using the resin layer containing the group IV b elements provided on the materials constructing a conventional spacecraft.

This resin layer, characteristically extremely smooth, oxidizes its surface and produce the shield layer to fend off the oxygen atoms, when exposed to the atomic oxygen. This shield layer prevents a further degradation caused by the oxygen interaction and therefore deters a severe loss of the surface layer.

The above and other objects, features, and advantages of the invention will become more apparent from the following description when taken in conjunction with the accompanying drawings.

DESCRIPTION OF THE PREFERRED EMBODIMENT

As for the resin layer (shield layer) pertaining to the invention, which has resistance to atomic oxygen and contains one of the group IV b elements and consequently averts degradation and loss of the surface layer even when it is exposed to the oxygen atom directly, for example, a ladder silicon polymer layer can be specified, which is expressed as shown in *Denki Kagaku*, Vol. 51, No. 7 (1983), pp. 554 to 559, by the following general formula I:

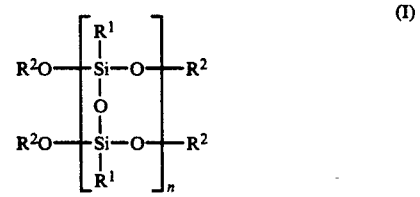

where R1, R2 are appropriately constructed hydrocarbon radicals where n is a positive integer (n being 100 or more)

Also, a substitutional resin layer that contains substituted para-methoxy of polystyrene, one of the group IV b elements expressed as shown in *RECUEIL* 79 1076 (1960) by the following general formula II:

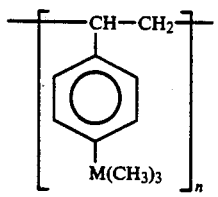

(II)

where M is one of the group IV b elements, such as Si, Ge, Sn, Pb
where n is a positive integer (n being 60 or more).

For this substitutional resin layer, either a resin containing a single element or a copolymer resin containing at least two kinds of elements can be used.

These resin layers made of the polymer, characteristically very smooth, oxidizes their surfaces to produce the shield layer that fends off the oxygen atoms, when exposed to the atomic oxygen. This shield layer then prevents degradation of the materials and loss of the surface layer.

Figure 1:
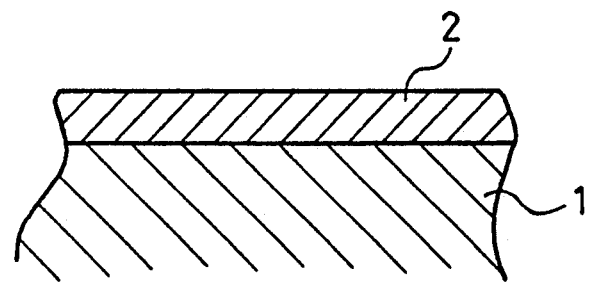
FIG. 1 shows a cutaway view of an embodiment of the present invention.
Figure 1:
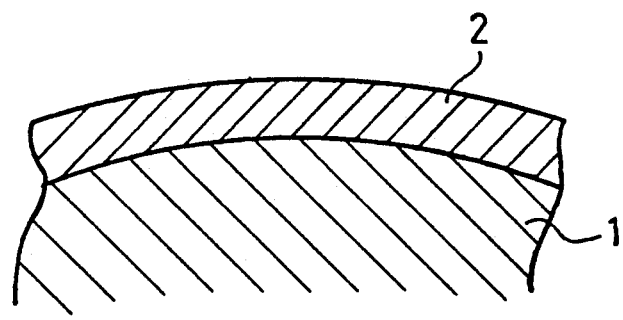

An embodiment of the present invention will be explained, hereinafter referring to the sectional view shown in FIG. 1. FIG. 1A shows material used in the plane surface. FIG. 1B shows material used in the curved surface.

In the Figure, numeral (1) indicates material used in the structural part of spacecraft. Conventionally, FRP (Fiber Reinforced Plastic) including CFRP (Carbon Fiber Reinforced Plastic) is used in this part. Numeral (2) indicates a resin layer (a shield layer) which contains the group IV b elements that tolerates oxygen atoms. The surface of the structural part (1) of the spacecraft made of the traditional materials is covered with the above mentioned layer containing the polymer having a thickness of 0.1~100 μm.

Thus, the material for use in the spacecraft parts pertaining to this invention is made of the resin layer containing the IV b element having the resistance to atomic oxygen for preventing the degradation even when it is exposed to the oxygen atom. This resin layer is provided on the conventional material, so that the surface of the structure is prevented from the deterioration caused by the oxygen atom. Consequently, the structure made of the material of the present invention can be used for a long time (from several months to several decades or more) in the environment exposed to the oxygen atom, which was impossible in the past.

Figure 2A:
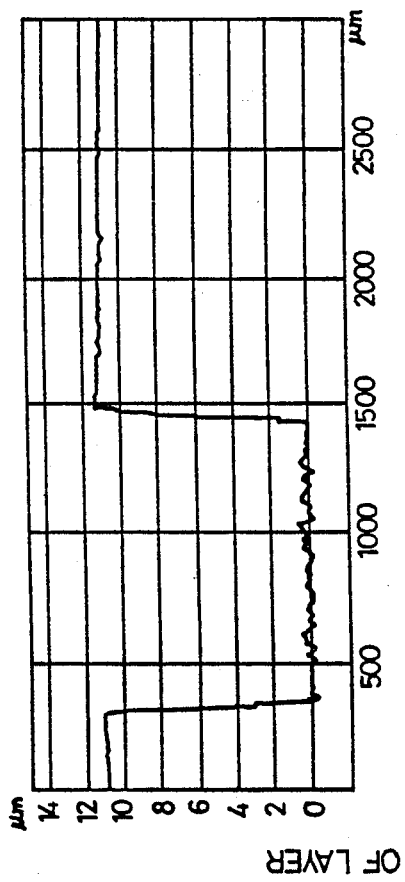
FIG. 2 shows the result of thickness measurement of a silicon polymer layer before and after the exposure thereof to oxygen atoms.
Figure 2B:
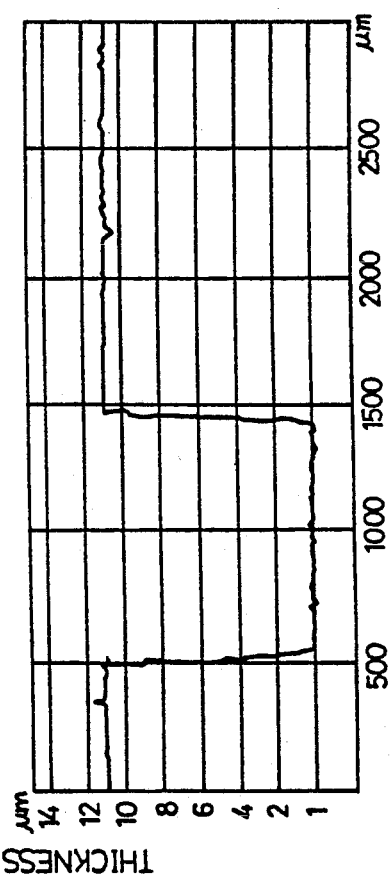
Figure 2C:
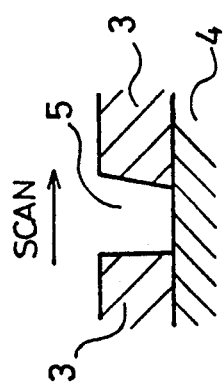

An embodiment of the present invention will be explained further in detail hereinafter referring to FIG. 2. The application of the present invention, however, is not limited to this embodiment.

EMBODIMENT 1

A silicon polymer is expressed by the following formula for average molecular weight 100,000, where ph is a phenyl radical.

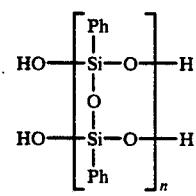

(III)

The silicon polymer is dissolved in an anisole solvent to produce a solution of 26% concentration. Then, a panel (4) made of CFRP is coated with this solvent and baked in nitrogen atmosphere, with the temperature of 150° C., for 30 minutes to produce a silicon polymer layer (3) with the thickness of approximately 11 μm.

A sample material thus coated with the silicon polymer layer (3) which has a smooth surface obtained in the manner illustrated above, is then exposed to the oxygen atoms by using an oxygen atomic exposure device.

A flux of the oxygen atoms irradiated with RF output of 100 w, a vacuum degree of 0.4 torr, and the amount of the oxygen gas flow of 75SCCM is performed under the same conditions of $10^{14} \sim 10^{15}$ atoms/cm as in the Space Shuttle flight test.

The exposure was performed for an hour. FIG. 2A and FIG. 2B show the result of the thickness measurement of the silicon polymer layer before and after the exposure. The measurement of the thickness of the layer is performed by measuring the difference between the level of the silicon polymer layer (30) and that of an opening (5) formed by removing a portion of the silicon polymer layer (3) until the surface of the panel (4) becomes bare. The result of the measurement, as shown in FIG. 2A and FIG. 2B, demonstrates little change in the thickness of the silicon polymer layer (3) before and after the exposure, and after further exposure, little change in the thickness is shown either.

EMBODIMENT 2

A polymer that has the molecular weight of 50,000 expressed by the general formula II, where M being Ge which is one of the group IV b metallic elements, is dissolved in xylene solvent at 20% concentration. The panel (4) made of CFRP is then coated with this solvent, using a spinner. The coated panel (4) is then baked for 30 minutes in the nitrogen atmosphere, with the temperature of 120° C., to produce a polymer layer (3) containing Ge, with the thickness of approximately 10 μm.

The sample created in the manner described above is then exposed to the oxygen atoms for approximately one hour under the same condition as in the experiment 1. Approximately 1% loss in the thickness of the polymer layer is demonstrated by the thickness measurement before and after the exposure. Further exposure, does not show a further loss in thickness of the layer.

EMBODIMENT 3

A polymer expressed by the general formula II, with M being Sn which is one of the group IV b metallic elements, is dissolved to produce a toluene solvent of 25% concentration. The panel (4) made of CFRP is then coated with this solvent, using the spinner. The panel (4) thus coated is then baked for 30 minutes in the nitrogen atmosphere, with the temperature of 100° C., to produce a polymer layer (3) which contains Sn, with the thickness of approximately 10.5 μm.

The sample created in the manner illustrated above was then exposed to the oxygen atoms for approximately one hour under the same condition as in the experiment 1. Approximately 1% loss in the thickness measurement before and is demonstrated by the thickness measurement before and after the exposure. A prolonged exposure does not show a further loss in the thickness of the layer.

Now, an applied example of the present invention will be explained hereinafter.

Figure 3:
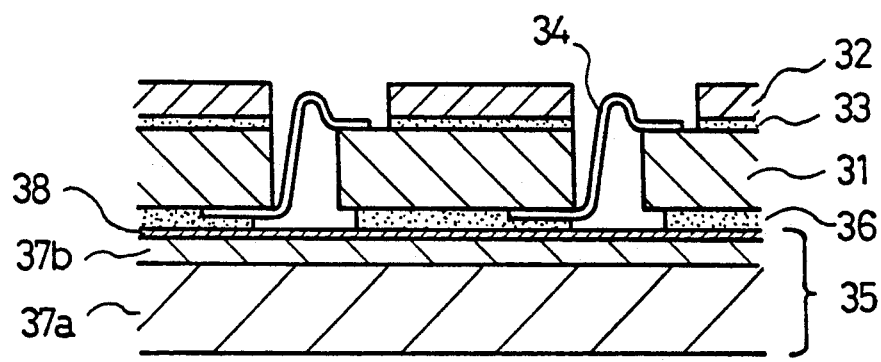
FIG. 3 shows a cutaway view of a solar battery for which this invention is used. It also shows an on-board solar battery paddle and the structure of the solar battery.
Figure 3B:
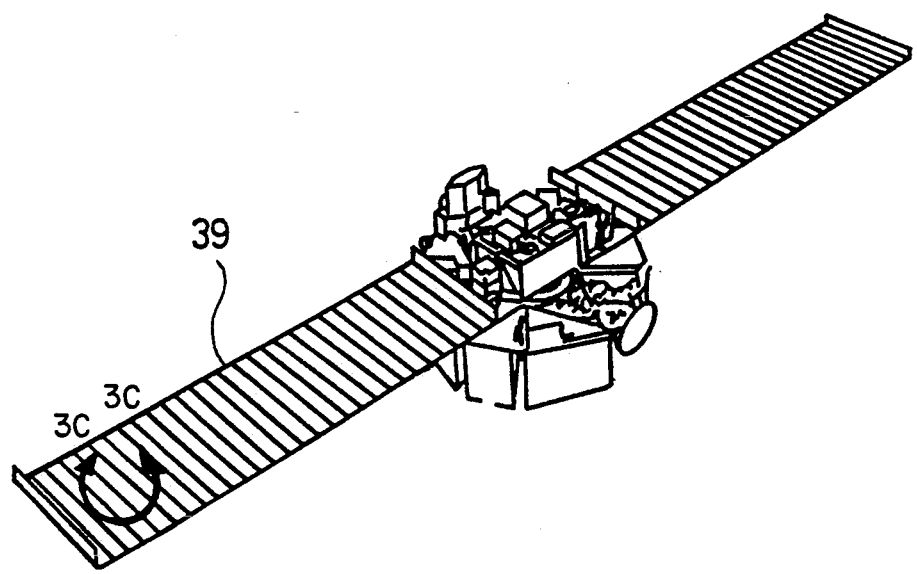
Figure 3C:
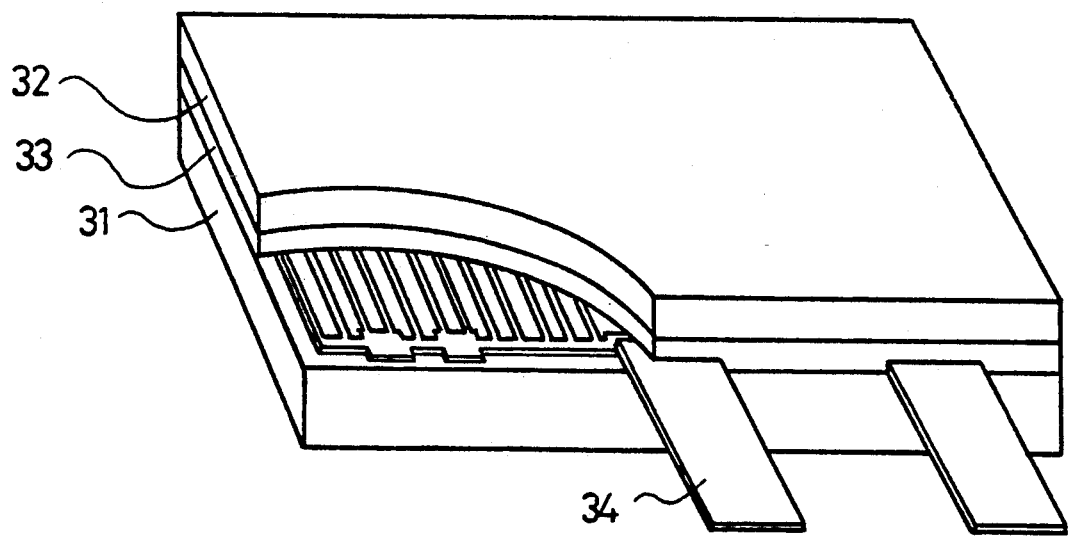

FIG. 3A shows a cutaway view of a solar battery and FIG. 3B shows structural drawings of an on-board solar battery paddle of a solar battery. In the Figure, numeral (31) indicates solar battery cells; numeral (32) indicates a cover glass that covers exterior of the solar battery cells (31); numeral (33) indicates an adhesive agent which joins the solar battery cells (31) to the cover glass (32); numeral (34) indicates an interconnector which joins each solar battery cell. A plurality of the solar battery cells (31) are adhered to the solar battery panel (35) by an adhesive agent (36) in a connected state, so as to construct a solar battery paddle (39). The make-up of the solar battery panel (35) is as follows: a construction material (37a) made of a traditional panel material intolerant of oxygen interaction, i.e., CFRP and the like, is coated with an insulating film (37b) to produce a laminate. This laminate is then coated with an insulating layer (38) made of a silicon resin layer which tolerates the oxygen interaction. In other words, the solar battery panel is constructed by coating the surface of a laminate made of both a traditional material (37a) used for the panel and the insulating film (37b) with the silicon polymer layer (38) shown in the general formula (1) illustrated above deposited thereover. The thickness of the silicon polymer is 0.1 to 100 μm.

This solar battery panel (35), by having material that constitutes the panel coated with the silicon resin layer (38) which tolerates the oxygen interaction, is prevented from the degradation of the surface after a direct exposure to the oxygen atoms in the orbit atmosphere, the solar battery panel, actualizing the prolonged use (several months to several decades or more) thereof in the environment exposed to the oxygen atoms.

In this application of the invention, the silicon polymer which has the average molecular weight of 100,000 as described in the embodiment 1 and expressed by the general formula (III):

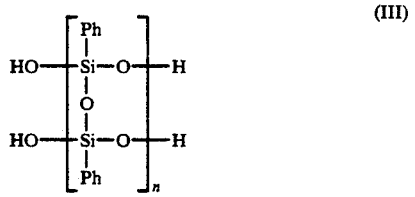

(III)

where Ph is a phenyl radical and n is a positive integer, is dissolved in an anisole solvent to produce a solution of 26% concentration. Then, with this solvent, the laminate placed on the solar battery panel (35) made of the material (37a) used in the structural part made of the CFRP and the insulating film (37b) are coated. This laminate coated with the solvent described above is then baked in the nitrogen atmosphere with the temperature of 150° C. for 30 minutes and then is dried to produce an insulating layer (38) of the silicon polymer, with thickness of approximately 11 μm.

The sample, the solar battery panel (35) coated with an insulating layer (38) made of the silicon polymer which has a smooth surface, produced in the manner specified above, was exposed to the oxygen atoms, using the oxygen atoms exposure device. The oxygen atoms flux used for the exposure was performed so as to simulate the condition used in the actual Space Shuttle flight test, that is $10^{14}$ to $10^{15}$ atoms/cm. sec.

Little change is observed in the thickness of the insulating layer (38) made of silicon polymer after the exposure.

The above result demonstrates that the solar battery panel constructed with conventional material coated with the insulating layer made of the silicon resinous compound, averts the degradation of the surfaces caused by the oxygen atom and therefore is suitable for a direct exposure to and the prolonged use in the atomic oxygen environment of the orbit.

Other application of the present invention will be further explained hereinafter.

Figure 4:
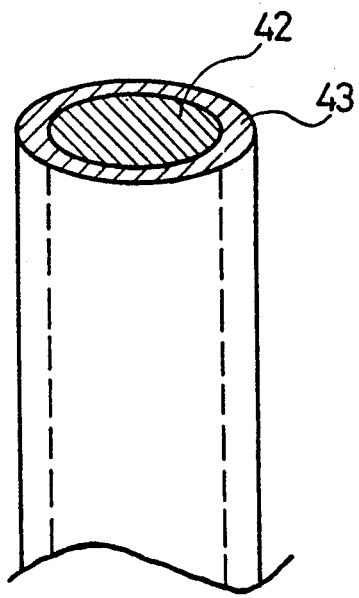
FIG. 4 shows cutaway views of other parts for which this invention is used.
Figure 4:
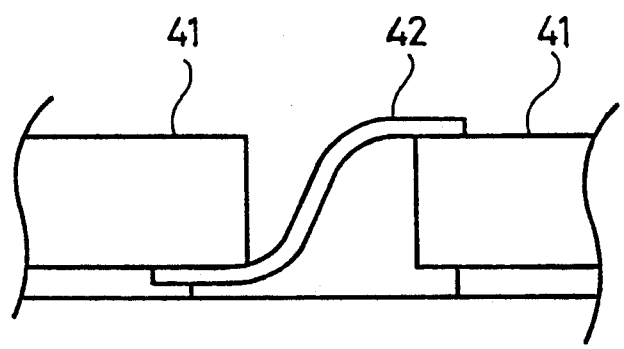

FIG. 4A and FIG. 4B show cutaway views of the other application of the invention. In the Figure, numeral (41) indicates solar battery cells placed on the exposed part of the spacecraft. Numeral (42) indicates exposed wires used in the interconnecting part that joins the solar battery cells (41). Numeral (43) indicates a resin layer which contains silicon (Si) or gerumanium (Ge), tin (Sn), and other group IV b elements that characteristically fend off the oxygen atoms. The surfaces of the exposed wires (42) are coated with this resin layer which has the thickness of 0.1 to 100 μm.

The experiment similar to that of the embodiment 1 was performed with respect to this resin layer. The result demonstrates little change in the thickness of the silicon polymer layer (43) after the exposure. Therefore, it is confirmed that the layer (43) averts the degradation caused by the oxygen interaction. The result of the above experiment demonstrates that the exposed surfaces of the traditional wires avert the degradation caused by the oxygen interaction, when coated with the silicon polymer layer (43). From this, it is concluded that the silicon polymer layer (43) described above is usable for coating material used in the wires, including, power cables, that will be used in the oxygen environment for a prolonged period.

Use of this invention, of course, is not limited to the cases specified in the above embodiments and applications. A various combination pertaining to use of the present invention is practicable. For example, gerumanium, tin, and other group IV b elements can become substitutes for the silicon.

Specification of the above embodiments and applications has been categorized according to the names: a resin layer; a shield layer; a insulating layer and a polymer layer, etc. These names, however, can be changed. For instance, a layer can be a layer-like or a film-like, or even a spotlike. Also, the thickness of the layer can be uneven or wave-like. Furthermore, coating of the material can be so performed as to cover only a part of the surface, instead of the whole surface.

It is important to understand that the present invention materializes the materials that evert the degradation caused by the oxygen interaction. The application of this invention to the traditional construction materials used in the spacecraft parts enables these materials for the prolonged use (from several months to several decades) in the oxygen environment of the orbit.

What is claimed is:

1. A material for use in spacecraft parts, at least a portion of said material being covered by a shield part having resistance to degradation by atomic oxygen, said shield part comprising a substituted para-methoxy polystyrene of the general formula:

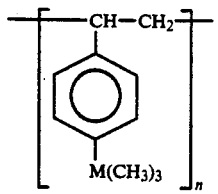

where M is selected from the group consisting of Si, Ge, Sn and Pb and n is at least 60.

2. A material for use in spacecraft parts according to claim 1, wherein said shield part comprises a copolymer resin of said substituted para-methoxy polystyrene with at least one other element.

3. A material for use in spacecraft parts according to claim 1, wherein said shield part has a thickness of from about 0.1 to about 100 micrometers.

4. A material for use in spacecraft parts according to claim 3, wherein said shield part has a thickness of about 10 micrometers.

5. A material for use in spacecraft parts according to claim 1, wherein said shield part loses about 1% of its thickness when exposed for about one hour to oxygen atoms having a density of about $10^{14}$–$10^{15}$ atoms per square centimeter at about 0.4 torr pressure.

6. A polymeric protective layer covering at least a portion of spacecraft parts that protects said parts against degradation by atomic oxygen, said polymeric protective layer comprising a substituted para-methoxy polystyrene, wherein said polymeric protective layer is produced by preparing a substituted para-methoxy polystyrene of molecular weight about 50,000 having a molecular structure of general formula:

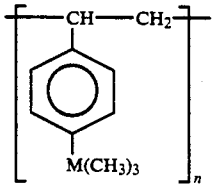

where M is Ge, dissolving said polystyrene in xylene to produce a solvent of 20% concentration, coating at least a portion of said parts with said solvent to a thickness of about 0.1 to 100 micrometers, heating said parts in a gaseous nitrogen-containing environment at a temperature of about 120° C. for about 30 minutes, so that a protective polymer layer containing germanium is formed, and drying said protective layer.

7. A polymeric protective layer as recited in claim 6, wherein said coating step comprises coating at least a portion of said parts with said solvent to a thickness such that said protective layer has a dried thickness of about 10 micrometers.

8. A polymeric protective layer covering at least a portion of spacecraft parts that protects said parts against degradation by atomic oxygen, said polymeric protective layer comprising a substituted para-methoxy polystyrene, wherein said polymeric protective layer is produced by preparing a substituted a para-methoxy polystyrene of molecular weight about 50,000 having a molecular structure of general formula:

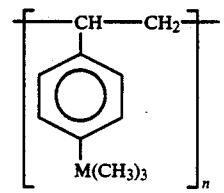

wherein M is tin, dissolving said polystyrene in toluene to produce a solvent of 28% concentration, coating at least a portion of said parts with said solvent to a thickness of about 0.1 to 100 micrometers, heating said parts in a gaseous nitrogen-containing environment at a temperature of about 120° C. for about 30 minutes, so that a protective polymer layer containing tin is formed, and drying said protective layer.

9. A polymeric protective layer as recited in claim 8, wherein said coating step comprises coating at least a portion of said parts with said solvent to a thickness such that said protective layer has a dried thickness of about 10.5 micrometers.

* * * * *